United States Patent [19]
Hedengren

[11] Patent Number: 5,822,392
[45] Date of Patent: Oct. 13, 1998

[54] MULTI-RESOLUTION DETECTION FOR INCREASING IN AN X-RAY IMAGING IMPLEMENTATION OF AN OBJECT

[75] Inventor: Kristina Helena Valborg Hedengren, Schenectady, N.Y.

[73] Assignee: General Electric Company, Schenectady, N.Y.

[21] Appl. No.: 774,978

[22] Filed: Dec. 26, 1996

[51] Int. Cl.⁶ .................................................. G06F 15/00
[52] U.S. Cl. ...................... 378/988; 378/19; 250/208.1
[58] Field of Search .............................. 378/19, 98.2, 98, 378/98.8, 62; 250/208.1, 363.01, 366, 370.08, 370.09

[56] References Cited

U.S. PATENT DOCUMENTS

| | | | |
|---|---|---|---|
| 3,973,128 | 8/1976 | LeMay | 378/19 |
| 5,340,988 | 8/1994 | Kingsley et al. | |
| 5,355,309 | 10/1994 | Eberhard et al. | 378/19 X |

*Primary Examiner*—David P. Porta
*Attorney, Agent, or Firm*—David C. Goldman; Marvin Snyder

[57] ABSTRACT

The present invention discloses a multi-resolution detector for use in an x-ray imaging implementation such as computed tomography and digital radiography. The multi-resolution detector includes a two-dimensional, m×n element array of low resolution detector elements and at least one high resolution detector element located about the two-dimensional, m×n element array of low resolution detector elements. After an object has been completely scanned with the multi-resolution detector the scan data from both the two-dimensional, m×n element array of low resolution detector elements and the high resolution detector element is used to reconstruct a high resolution image. In particular, the scan data generated from the two-dimensional, m×n element array of low resolution detector elements is used along with the initial scan data generated from the high resolution detector element to iteratively construct a high resolution image of the object.

32 Claims, 6 Drawing Sheets

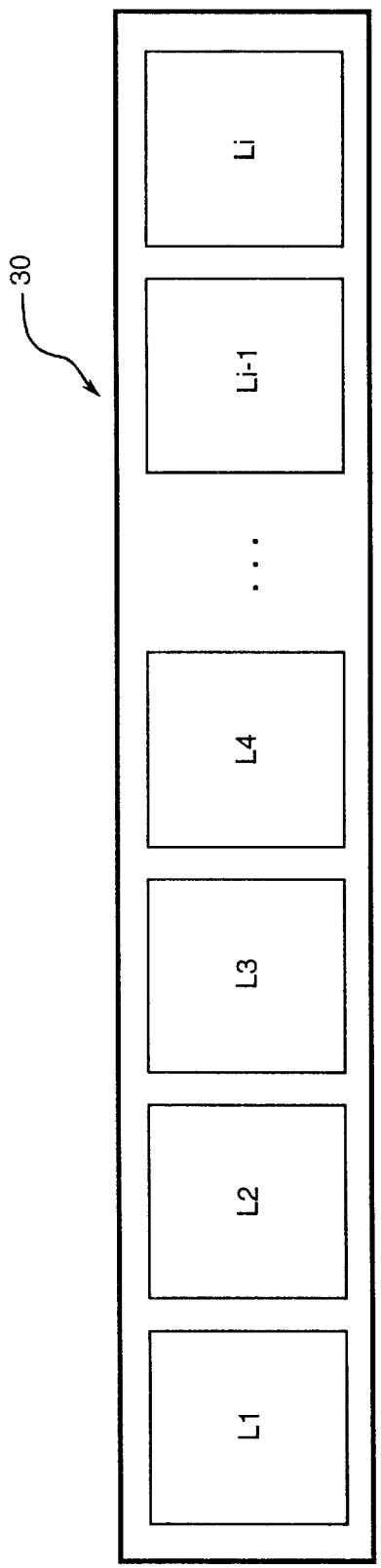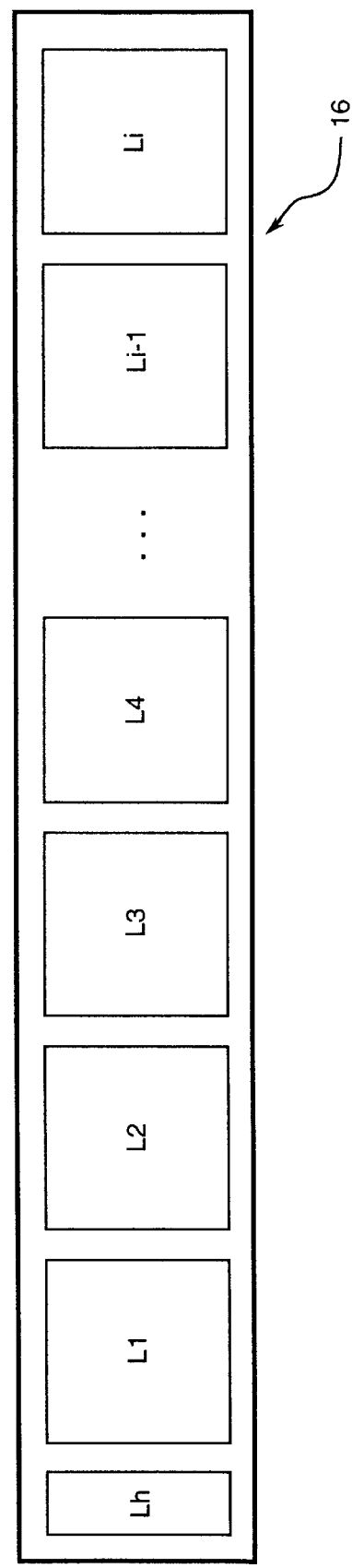

MULTI-RESOLUTION DETECTION FOR INCREASING IN AN X-RAY IMAGING IMPLEMENTATION OF AN OBJECT

BACKGROUND OF THE INVENTION

The present invention relates generally to imaging an object with x-rays and more particularly to increasing the resolution in an x-ray imaging implementation.

In a typical x-ray imaging implementation, an x-ray source is used to irradiate an object with x-ray energy. The x-ray energy passing through the object is detected by an x-ray detector. A scintillator detector is typically used in an x-ray imaging implementation to detect the x-ray energy passing through the object. The scintillator detector is generally formed from a slab of scintillator that has been diced into an array of small identical detector elements. The spatial resolution of an image generated from the array of small identical detector elements depends on the physical size of each detector element in the array in addition to the spot size of the x-ray source. More specifically, the smaller that the detector elements are, the better will be the resolution. However, there are several problems associated with having an array of smaller detector elements. For instance, an array of smaller detector elements needs more precise fabrication and mechanical registration of the elements as compared to an array of larger detector elements. In addition, an array of smaller detector elements require more electronics in order to acquire the detected data. Another disadvantage associated with the array of smaller detector elements is that the array of smaller detector elements covers proportionately less area of the imaged object than an array of larger detector elements due to the increased fraction of element-to-element separations.

In order to avoid some of the problems associated with using an array of smaller detector elements, attempts have been made to increase the resolution of images generated in an x-ray imaging implementation by using an array of larger detector elements and scanning the object twice with the detector. In this approach, the object is scanned with the array of larger detector elements in a first position and then scanned again with the array in a second position. In the second scan position, the array of larger detector elements is positioned at a location that is offset from the first scan position by one-half of one of the larger detector elements in the array. Scan data obtained from both the first and second scan are then combined, with the second scan data interleaved between the first scan data, and reconstructed to form an image. Due to the oversamples, the reconstructed image provides additional information that makes it look like there is higher pixel resolution, but there really is less detail in the image as compared to an image generated from array of smaller detector elements. There is less detail in the image because the actual spatial resolution in this approach is limited by the detector element size in the array. As a result, structures that are smaller than the detector element size in the array will not be resolved with this approach. However, signal conditioning can be used to enhance the resolution.

Since the above-mentioned approaches either are too difficult to implement or provide images that are lacking in resolution, there is a need for a detector that can combine the characteristics of the array of smaller detector elements that generate high resolution images with the characteristics of the array of larger detector elements that uses a multiple scanning scheme in order to provide more detailed images without the fabrication challenges.

SUMMARY OF THE INVENTION

Accordingly, it is a primary objective of the present invention to provide a multi-resolution detector that can provide a major gain in spatial resolution without substantially increasing the electronic complexity and without increasing the fabrication challenge.

Another objective of the present invention is to provide a system and method that uses the multi-resolution detector in an x-ray imaging implementation to provide high resolution images.

Still another objective of the present invention is to provide a system and method that uses the multi-resolution detector in an x-ray imaging implementation that is able to reconstruct high resolution data from low resolution data.

Yet another objective of the present invention is to provide a system and method that uses the multi-resolution detector with additional high resolution detector elements in an x-ray imaging implementation in order to reduce reconstruction noise.

Thus, in accordance with one embodiment of the present invention, there is provided a multi-resolution detector array. The detector array comprises a two-dimensional, m×n element array of low resolution detector elements. In addition, there is at least one high resolution detector element located about the two-dimensional, m×n element array of low resolution detector elements. In particular, there is a high resolution detector element located at selected rows and columns in the two-dimensional, m×n element array of low resolution detector elements. Data values generated from the two-dimensional, m×n element array of low resolution detector elements are used along with data values generated from the high resolution detector element to provide a high resolution image.

In accordance with a second embodiment of the present invention, there is provided a system and method for increasing resolution in an x-ray imaging implementation of an object. In this embodiment there is an x-ray energy source. The x-ray energy source emits x-ray energy at the object. A multi-resolution detector array acquires the x-ray energy passing through the object. The multi-resolution detector comprises a two-dimensional, m×n element array of low resolution detector elements and at least one high resolution detector element located about the two-dimensional, m×n element array of low resolution detector elements. In particular, there is a high resolution detector element located at selected rows and columns in the two-dimensional, m×n element array of low resolution detector elements. A scanning means scans the multi-resolution detector about the object by a predetermined spatial increment while being irradiated with x-ray energy. A reconstructing means reconstructs an image of the object from data provided by the multi-resolution detector. In particular, the reconstructing means uses data values generated from the two-dimensional, m×n element array of low resolution detector elements along with data values generated from the high resolution detector element to iteratively reconstruct a higher resolution image of the object.

In accordance with a third embodiment of the present invention, there is provided a system and method for increasing resolution in an x-ray imaging implementation of an object. In this embodiment there is an x-ray energy source. The x-ray energy source emits x-ray energy at the object. A multi-resolution detector array acquires the x-ray energy passing through the object. The multi-resolution detector comprises a two-dimensional, m×n element array of low resolution detector elements. A scanning means scans the multi-resolution detector about the object by a predetermined spatial increment while being irradiated with x-ray energy. A reconstructing means reconstructs an image of the object from the data provided by the multi-resolution detector. In particular, the reconstructing means uses data values generated from the two-dimensional, m×n element array of low resolution detector elements along with estimated data values to iteratively reconstruct an image of the object.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIG. 2 is a face view of a conventional linear array of n larger detector elements;

FIG. 3 is a face view of the multi-resolution detector according to a first embodiment of the present invention;

DETAILED DESCRIPTION OF THE PRESENT INVENTION

Figure 1:
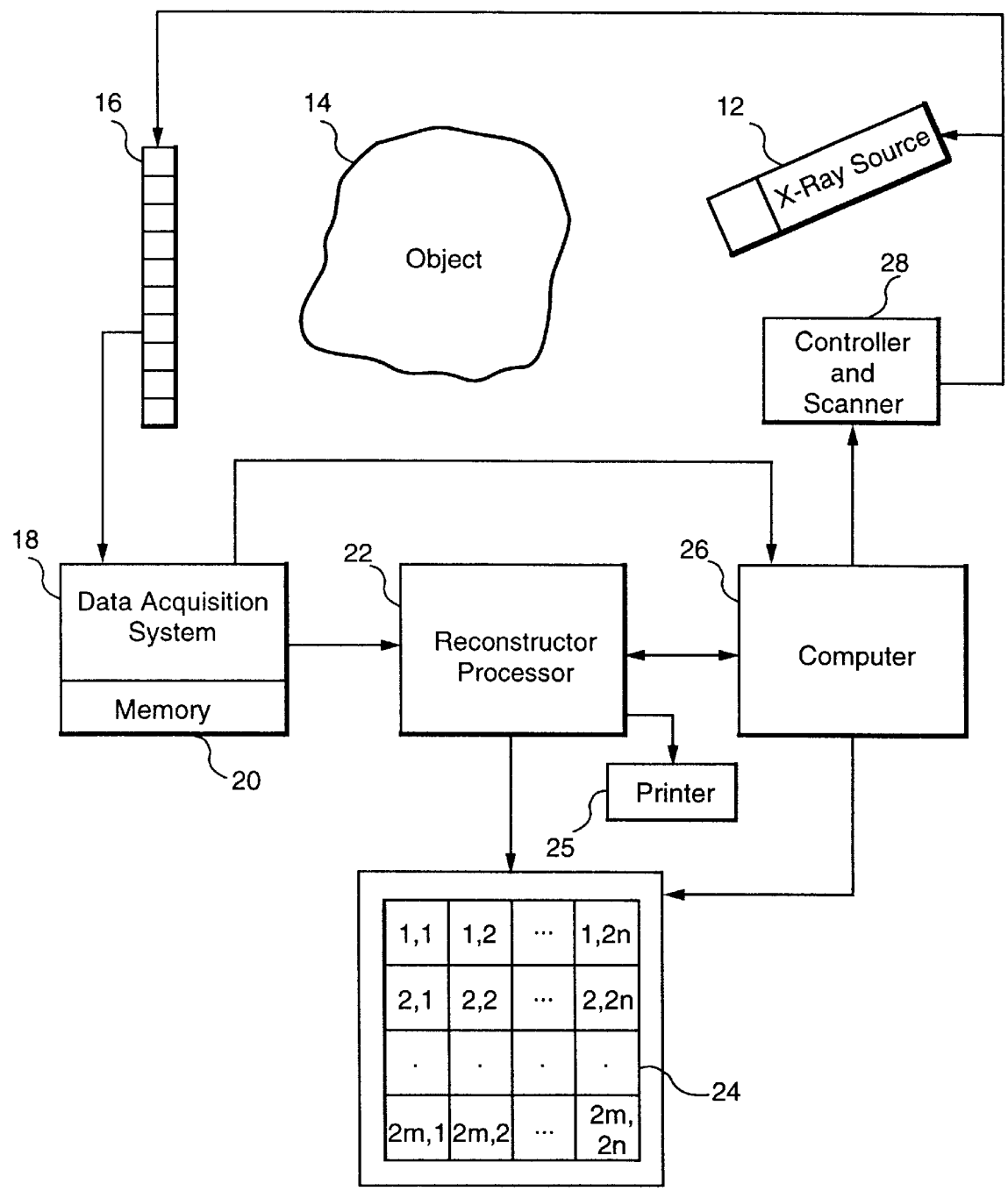
FIG. 1 is a block diagram of an x-ray imaging system according to the present invention.

FIG. 1 is a block diagram of an x-ray imaging system 10 used in the present invention. In the x-ray imaging system 10, an x-ray energy source 12 emits x-ray energy at an object 14. The x-ray energy passing through the object 14 is acquired by a photosensitive multi-resolution detector 16. Although the multi-resolution detector 16 is shown in FIG. 1 as a linear array it may be a two dimensional array. The data acquired by the photosensitive multi-resolution detector 16 are converted to corresponding electrical signals and sent to a data acquisition system 18 where they are stored in digital form in a memory 20. A more detailed description of data acquisition is provided in Andrews et al., DIGITAL IMAGE RESTORATION 61–89 (1977), which is incorporated herein by reference. The digital values may then be sent from the memory 20 in the data acquisition system 18 to a reconstructor processor 22 for performing a series of steps to reconstruct an image of the object 14. The reconstructed image may then be sent from the reconstructor processor 22 to a display screen 24 which displays the image of the object 14 on the screen. Alternately, the image may be sent to a printer 25 for printing a copy of the image from either the reconstructor processor 22 or the display 24. Printing can be on conventional paper or on film to be used by a radiographer using light boxes (i.e., a conventional display for x-ray film). The reconstructor processor 22 may also send the reconstructed image to a computer 26 for further processing and subsequent display. Alternatively, the digital values may be sent directly from the memory 20 in the data acquisition system 18 to the computer 26 for reconstruction of an image. The reconstructed image is then sent from the computer 26 to the display screen 24 for display or to the printer 25 for printing. The display screen 24 shows an example of an image reconstructed with an oversampling factor of two. The reconstruction and oversampling is explained later in further detail. Connected to the computer 26 is a controller and a scanner 28 for providing spatial increment scanning of the object 14 between the x-ray source 12 and the multi-resolution detector 16. Although the controller and scanner 28 is used to move the x-ray source 12 and the multi-resolution detector 16, it may instead be used to move the object 14 relative to the source and detector, if desired.

As mentioned above, the spatial resolution of an image generated in an x-ray imaging system will be limited if an array of larger detector elements is used. An example of an array 30 of larger detector elements is shown in FIG. 2. In particular, FIG. 2 shows a face view of a conventional linear array of Li larger detector elements (i.e., L1, L2, . . . Li–1, Li). Each of the larger detector elements is isolated from each other and have a thickness that is limited to about ten times the spacing therebetween. A disadvantage associated with this conventional linear array of detector elements is that the spatial resolution depends on the element size. In particular, resolution cannot be resolved below the element size of the element in the array. Therefore, the reconstructed image may have less spatial resolution and less than desirable detail.

The present invention has overcome the problems associated with the conventional linear array of larger detector elements by using the multi-resolution detector 16. The multi-resolution detector 16 according to one embodiment is shown in more detail in FIG. 3. In particular, FIG. 3 shows a face view of the multi-resolution detector 16 according to a first embodiment of the present invention. The multi-resolution detector 16 in FIG. 3 comprises a one-dimensional array of Li low resolution detector elements (i.e., L1, L2, . . . Li–1, Li) and a single high resolution detector element, Lh, located about the one-dimensional array of low resolution detector elements. In the illustrative embodiment, the high resolution detector element, Lh, is located before the first low resolution detector element, L1. However, the high resolution element Lh may be located at other locations since the image reconstruction which is explained below will account for its position. Both the one-dimensional array of low resolution detector elements (i.e., L1, L2, . . . Li–1, Li) and the single high resolution detector element, Lh, generate scan data values of the object 14. The data values are then converted to corresponding electrical signals and sent to the data acquisition system 18 where they are digitized and stored in the memory 20. The controller 28 then moves the multi-resolution detector 16 relative to the x-ray source 12 and the object 14. Scan data values are again acquired by the multi-resolution detector 16 and then the controller 28 moves the detector to the next scan position for acquiring more data. This process continues until the high resolution element has stepwise overlayed the whole area of the first low resolution element. As an example, for an oversampling by two, data are acquired in the initial position and in two incremental positions for a linear array. For a two-dimensional array with oversampling in both directions, data are acquired in the initial position and in four incremental positions. The digitized electrical signals are then sent from the memory 20 to either the reconstructor processor 22 or to the computer 26 for reconstruction of an image.

Figure 4:
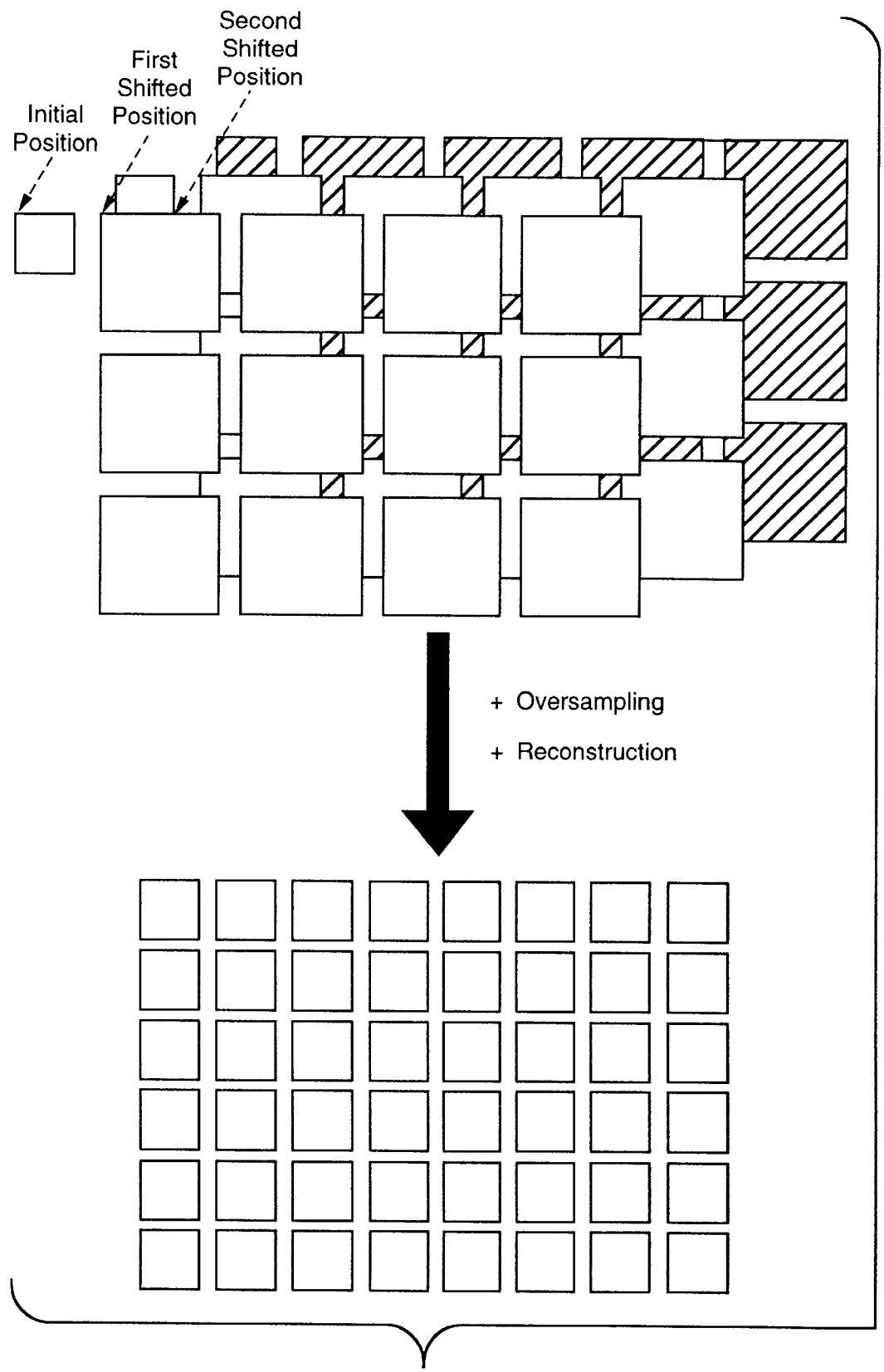
FIG. 4 is a conceptual illustration of image reconstruction according to the present invention.

The image is reconstructed according to how the one-dimensional array of low resolution detector elements (i.e., L1, L2, . . . Li–1, Li) and the single high resolution detector element, Lh, are scanned about the object 14. In the above described scanning procedure, each low resolution detector element receives scan data of an area of the object that is also partially covered by an adjacent detector element position. The amount that each low resolution detector element is partially covered by an adjacent detector element depends on how much incremental scanning or oversampling of the elements is used. For example, if an oversampling factor of two were used, then the same one-half of the underlying object is reflected in two measurements of two adjacent low resolution detectors. In the reconstruction process of the present invention, the data values from the low resolution detectors are used to reconstruct high resolution image pixels corresponding to x-ray energy which would be measured by a high resolution element if it had been there at each element location. In particular, the data values of the high resolution detector element at each scan position provides initial conditions for the reconstruction of the low resolution data values into a high resolution image. The initial values are then used along with subsequent data values from the low resolution detector elements to iteratively construct high resolution image pixels at each scan position. Thus, all structures of a given size within the object that would have been resolved if a high resolution detector array was used can be reconstructed from the data values from the array of low resolution detector elements along with the initial data values provided by the high resolution detector element and iterative calculation. The foregoing image reconstruction is conceptually illustrated in FIG. 4.

Figure 5:
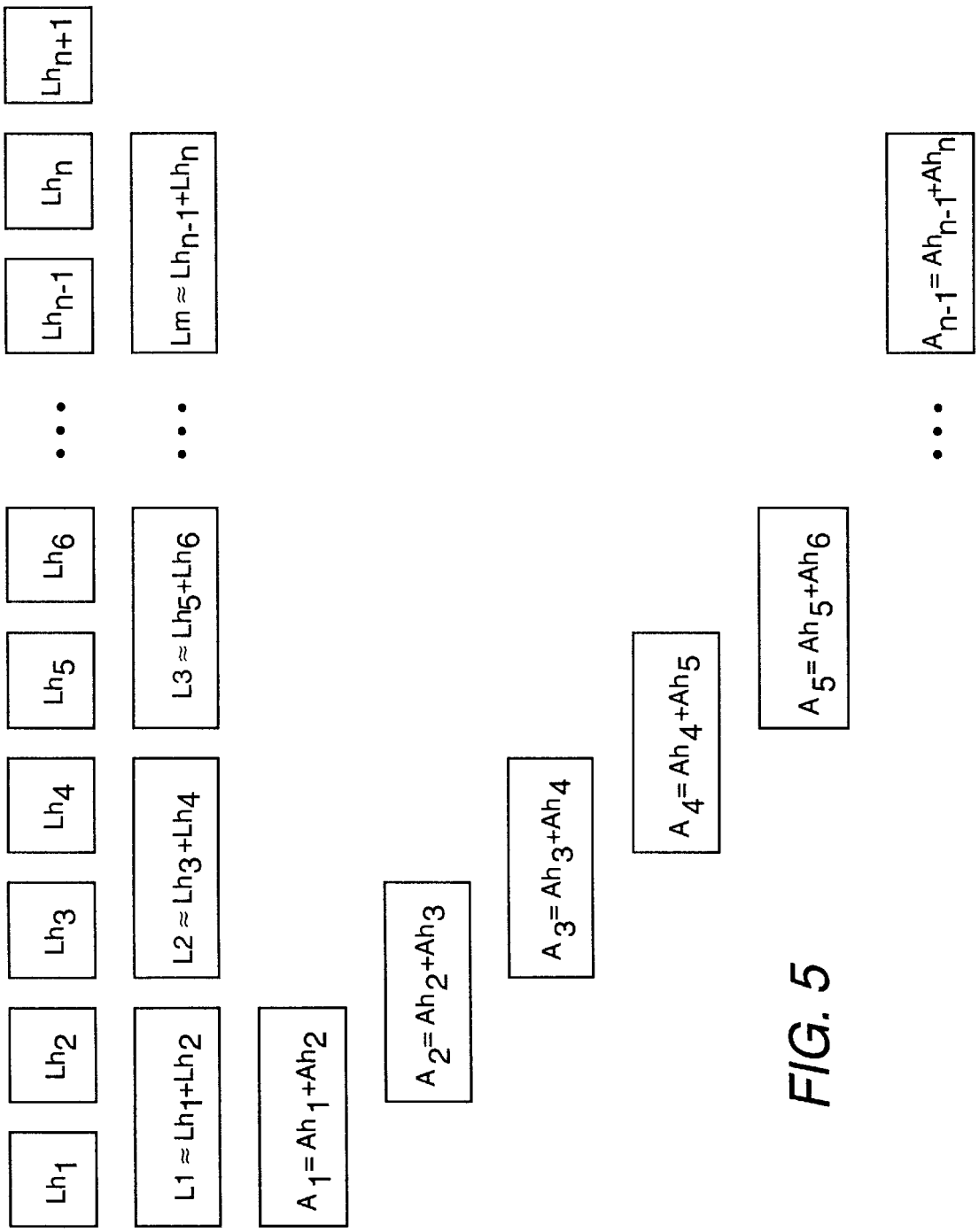
FIG. 5 is a schematic illustration of the image reconstruction according to the present invention.

FIG. 5 provides a schematic illustration of how the image is reconstructed according to the present invention. In FIG. 5 the scanning with all high resolution detector elements is represented by $Lh_i$ elements, wherein i=1,2,3, ... n, and the scanning of the array of low resolution detector elements is represented by Li elements, wherein i=1,2,3, ... m. In this example m=n/2 because the object is oversampled by a factor of 2. Thus, the low resolution detector element L1 covers essentially the same area as would be covered by high resolution elements $Lh_1$ and $Lh_2$ and is represented by $L1 \approx Lh_1 + Lh_2$. Consequently, $L2 \approx Lh_3 + Lh_4$, $L3 \approx Lh_5 + Lh_6$, ... . $Lm \approx Lh_{n-1} + Lh_n$. When the low resolution detector data are oversampled so that one-half of the underlying object is reflected in two adjacent measurements the oversampled low resolution scan data are represented by $A_1, A_2, A_3, A_4, A_5$, ... $A_{n-1}, A_n$, wherein $A_1 = Ah_1 + Ah_2$, $A_2 = Ah_2 + Ah_3$, $A_3 = Ah_3 + Ah_4$, $A_4 = Ah_4 + Ah_5$, $A_5 = Ah_5 + Ah_6$, ... $A_{n-1} = Ah_{n-1} + Ah_n$. A derivative image for the oversampled low resolution scan data is determined by subtracting the adjacent oversampled low resolution data from each other. In particular, $A_1$ is subtracted from $A_2$, $A_2$ is subtracted from $A_3$, $A_3$ is subtracted from $A_4$, $A_4$ is subtracted from $A_5$. These differences are then used to provide a derivative image for the difference between $A_{n-1}$ and $A_n$. For example, the difference between $A_2$ and $A_1$ and $A_3$ and $A_4$ will result in the following.

$A_2 - A_1 = Ah_2 + Ah_3 - (Ah_1 + Ah_2)$ $A_2 - A_1 = Ah_3 - Ah_1$ $A_3 - A_2 = Ah_3 + Ah_4 - (Ah_2 + Ah_3)$ $A_3 - A_2 = Ah_4 - Ah_2$

The above results can be generalized to derive the following relationships:

$A_{n+1} - A_n = Ah_{n+2} - Ah_n$ $Ah_{n+2} = A_{n+1} - A_n + Ah_n$ wherein $Ah_{n+2}$ is a constructed high resolution pixel value, $A_{n+1}$ and $A_n$ are measured low resolution scan data, and $Ah_n$ is an initial condition using a prior high resolution pixel value. Subsequently, other high resolution pixel values such as $Ah_{n+3}$ and $Ah_{n+4}$ would be determined as follows.

$Ah_{n+3} = A_{n+2} - A_{n+1} + Ah_{n+1}$ $Ah_{n+4} = A_{n+3} - A_{n+2} + Ah_{n+2}$

Therefore, each high resolution pixel value can be constructed from the derivative value of low resolution scan data and an initial condition. Consequently, a mathematically exact high resolution image can be constructed iteratively from the derivative image using only initial conditions provided by the physical high resolution elements and subsequent calculated initial conditions (i.e., calculated high resolution pixel values).

Figure 6A:
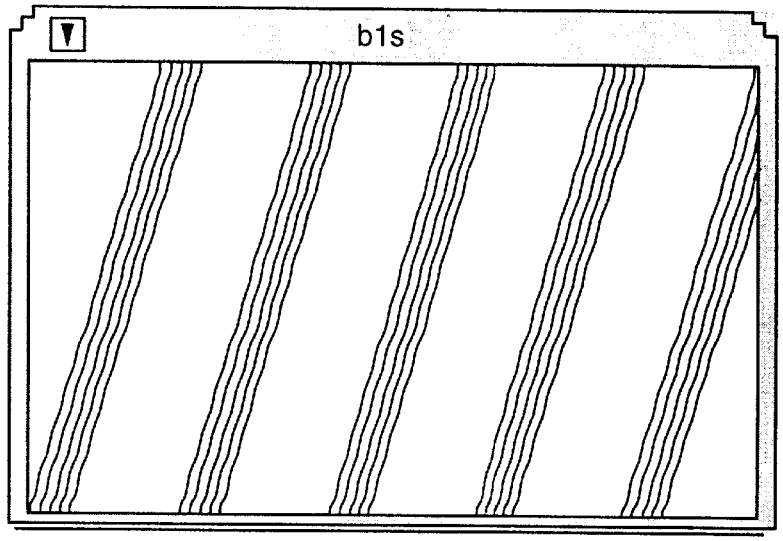
FIGS. 6a–6c illustrate the increase in resolution for a multi-resolution detector according to the present invention that is operating with an oversampling factor of three versus the resolution for a conventional array of large detector elements that is also operating with an oversampling factor of three.
Figure 6B:
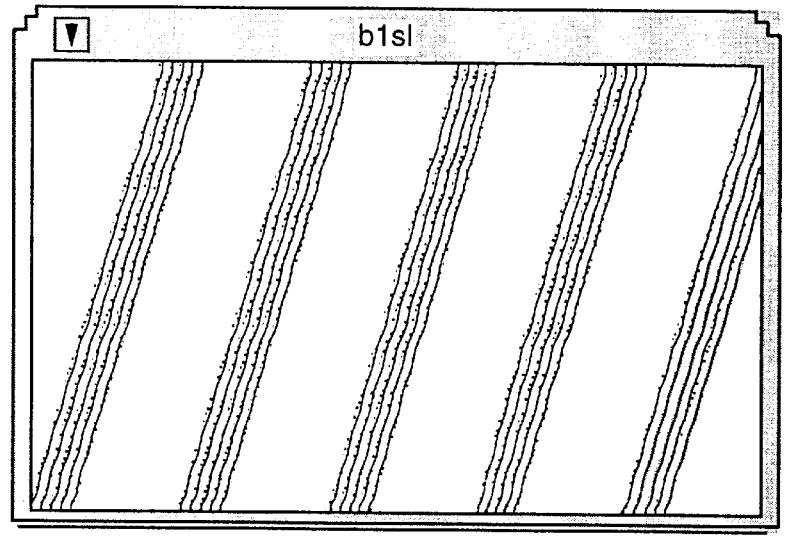
Figure 6C:
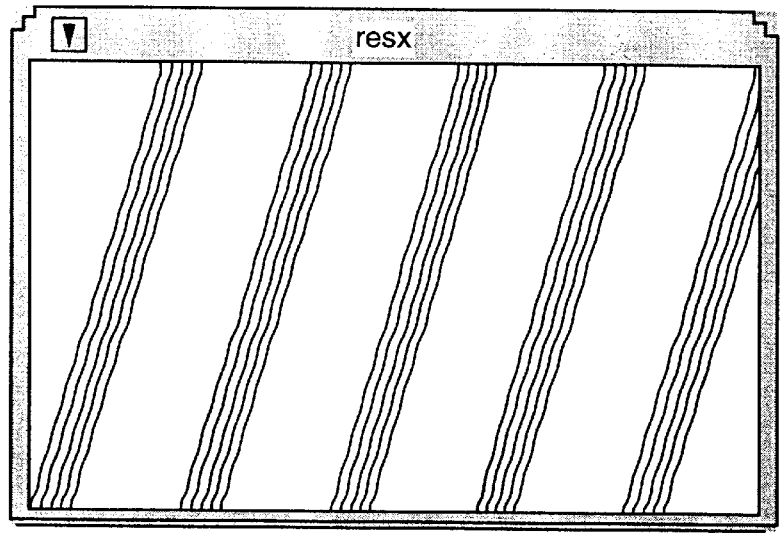

Although the above-embodiment was described with reference to an oversampling factor of two, the present invention is not limited to this factor and can be oversampled by larger factors. The increase in resolution for a multi-resolution detector operating with an oversampling factor of three according to the present invention versus a conventional array of large detector elements also operating with an oversampling factor of three is shown in FIGS. 6a–6c. FIG. 6a actually shows a high resolution image of a conventional x-ray line pair resolution test piece generated from a conventional array of small detector elements. This high resolution image shows the ability to resolve line pairs of varying separation. FIGS. 6b–6c show simulated results. FIG. 6b shows an oversampled low resolution image generated from a conventional array of large detector elements. In this image the detector size is three times as wide and three times as high as the detector used in FIG. 6a. The blurred appearance of the image is due to the larger detector size which results in a reduced ability to resolve the line pairs. FIG. 6c shows an image of FIG. 6b after it has been reconstructed according to the present invention. This image appears very similar to the high resolution image shown in FIG. 6a.

Figure 7:
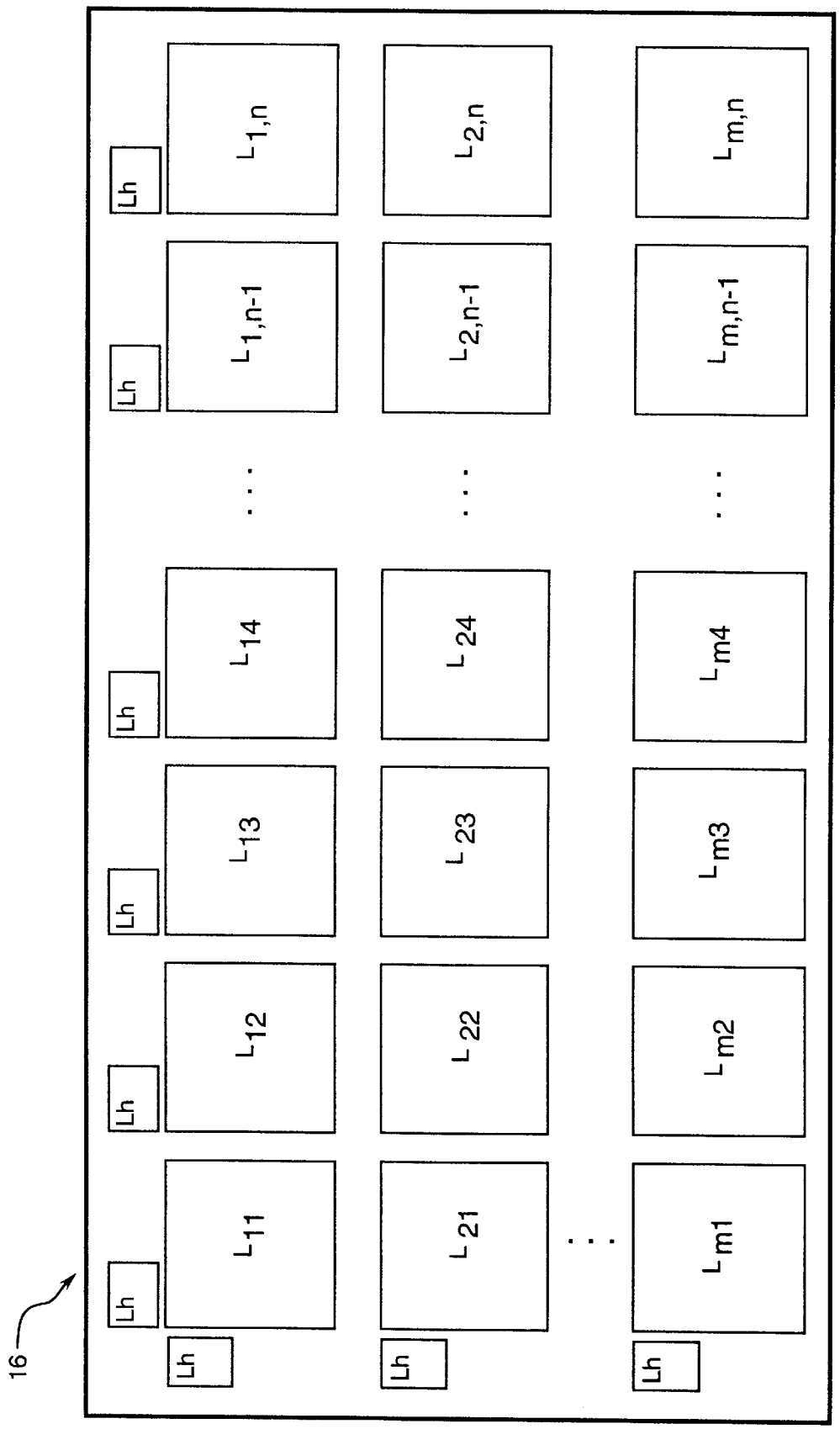
FIG. 7 is a face view of the multi-resolution detector according to a second embodiment of the present invention.

The multi-resolution detector of the present invention is not limited to a one-dimensional array of low resolution detector elements and a single high resolution element. Instead, the multi-resolution detector can be extended to additional dimensions if desired. For each additional dimension added, both the array of low resolution detector elements and the high resolution detector element are adjusted accordingly. For example, FIG. 7 shows the face view of the multi-resolution detector having a two-dimensional array of detector elements and one additional high resolution element for each dimensional row and column. More specifically, the two-dimensional array of low resolution detector elements comprises m rows of detector elements and n columns of detector elements and the high resolution detector element includes a detector element, Lh, at every row and every column in the two-dimensional array. The additional high resolution elements in the columns are helpful in reducing reconstruction noise. In this embodiment, after the object has been completely scanned, the scan data generated from the two-dimensional array of low resolution detector elements is used along with the initial scan data generated from the high resolution detector elements to iteratively construct a high resolution image of the object in a similar manner. After the image has been reconstructed it is then displayed on the display screen 24 or printed on the printer 25.

It is therefore apparent that there has been provided in accordance with the present invention, a multi-resolution detector and a system and method for increasing the resolution of an image generated from an x-ray imaging implementation that fully satisfy the aims and advantages and objectives hereinbefore set forth. The invention has been described with reference to several embodiments, however, it will be appreciated that variations and modifications can be effected by a person of ordinary skill in the art without departing from the scope of the invention. For example, the multi-resolution detector is not limited to scintillator type or solid state detectors and can be used with other detectors such as xenon type detectors. In addition, the system and method for increasing the resolution of an image generated can be used with other sensor modalities and applications such as piezoelectric materials in an ultrasound application. Furthermore, the system and method for increasing the resolution of an image can be used with a multi-resolution detector that comprises only an array of low resolution detector elements. Instead of using a high resolution detector element, the initial condition values needed for the image reconstruction can be estimated. In addition, it is recognized that all initial values can be calculated with just one high resolution element if the scanning and data acquisition are done so that each segment of a low resolution element is covered at some time. This is true for linear arrays as well as for two-dimensional arrays.

I claim:

1. A multi-resolution detector array, comprising:
   a two-dimensional, m×n element array of low resolution detector elements; and
   at least one high resolution detector element located about the two-dimensional, m×n element array of low resolution detector elements, wherein the at least one high resolution detector element is located at selected rows and columns in the two-dimensional, m×n element array of low resolution detector elements, wherein the two-dimensional, m×n element array of low resolution detector elements generates first data values and the at least one high resolution detector element generates second data values, the first and second data values used to provide a high resolution image.

2. The multi-resolution detector array according to claim 1, wherein the two-dimensional, m×n element array of low resolution detector elements is one dimensional and comprises $L_i$ elements, wherein i=1,2,3, . . . m.

3. The multi-resolution detector array according to claim 2, wherein the at least one high resolution detector element comprises at least one high resolution detector element $L_h$.

4. The multi-resolution detector array according to claim 1, wherein the two-dimensional, m×n element array of low resolution detector elements is two dimensional and comprises m rows by n columns of elements.

5. The multi-resolution detector array according to claim 4, wherein the at least one high resolution detector element comprises high resolution detector elements $Lh_{ij}$ for corresponding rows and columns.

6. The multi-resolution detector array according to claim 1, wherein the at least one high resolution detector element comprises one high resolution detector element $L_h$.

7. A system for increasing resolution in an x-ray imaging implementation of an object, comprising:
   an x-ray energy source;
   means for emitting x-ray energy at the object;
   a multi-resolution detector array for acquiring the x-ray energy passing through the object, the multi-resolution detector array comprising a two-dimensional, m×n element array of low resolution detector elements and at least one high resolution detector element located about the two-dimensional, m×n element array of low resolution detector elements, wherein the at least one high resolution detector element is located at selected rows and columns in the two-dimensional, m×n element array of low resolution detector elements;
   means for scanning the multi-resolution detector about the object by a predetermined spatial increment while being irradiated with x-ray energy; and
   means for reconstructing an image of the object from data provided by the multi-resolution detector, wherein the reconstructing means uses data values generated from the two-dimensional, m×n element array of low resolution detector elements along with data values generated from the at least one high resolution detector element to iteratively reconstruct an image of the object.

8. The system according to claim 7, wherein the two-dimensional, m×n element array of low resolution detector elements in the multi-resolution detector is one dimensional and comprises $L_i$ elements, wherein i=1,2,3, . . . m.

9. The system according to claim 8, wherein the at least one high resolution detector element in the multi-resolution detector comprises at least one high resolution detector element $L_h$.

10. The system according to claim 7, wherein the two-dimensional, m×n element array of low resolution detector elements in the multi-resolution detector is two dimensional and comprises m rows by n columns of elements.

11. The system according to claim 10, wherein the at least one high resolution detector element in the multi-resolution detector comprises high resolution detector elements $Lh_{ij}$ for corresponding rows and columns.

12. The multi-resolution detector array according to claim 7, wherein the at least one high resolution detector element comprises one high resolution detector element $L_h$.

13. The system according to claim 7, further comprising a display for displaying the reconstructed image of the object.

14. The system according to claim 7, further comprising a printer for printing the reconstructed image of the object.

15. A method for increasing resolution in an x-ray imaging implementation of an object, the method comprising the steps of:
   providing an x-ray energy source;
   emitting x-ray energy at the object;
   acquiring the x-ray energy passing through the object with a multi-resolution detector comprising a two-dimensional, m×n element array of low resolution detector elements and at least one high resolution detector element located about the two-dimensional, m×n element array of low resolution detector elements, wherein the at least one high resolution detector element is located at selected rows and columns in the two-dimensional, m×n element array of low resolution detector elements;
   scanning the multi-resolution detector about the object by a predetermined spatial increment while being irradiated with x-ray energy; and reconstructing an image of the object from data provided by the multi-resolution detector, wherein the reconstructing uses data values generated from the two-dimensional, m×n element array of low resolution detector elements along with data values generated from the at least one high resolution detector element to iteratively reconstruct an image of the object.

16. The method according to claim 15, wherein the two-dimensional, m×n element array of low resolution detector elements in the multi-resolution detector is one dimensional and comprises $L_i$ elements, wherein i=1,2,3, . . . m.

17. The method according to claim 16, wherein the at least one high resolution detector element in the multi-resolution detector comprises at least one high resolution detector element $L_h$.

18. The method according to claim 15, wherein the two-dimensional, m×n element array of low resolution detector elements in the multi-resolution detector is two dimensional and comprises m rows by n columns of elements.

19. The method according to claim 18, wherein the at least one high resolution detector element in the multi-resolution detector comprises high resolution detector elements $Lh_{ij}$ for corresponding rows and columns.

20. The method according to claim 15, wherein the at least one high resolution detector element comprises one high resolution detector element Lh.

21. The method according to claim 15, further comprising the step of displaying the reconstructed image of the object.

22. The method according to claim 15, further comprising printing a copy of the reconstructed image of the object.

23. A system for increasing resolution in an x-ray imaging implementation of an object, comprising:

an x-ray energy source;

means for emitting x-ray energy at the object;

a multi-resolution detector array for acquiring the x-ray energy passing through the object, the multi-resolution detector array comprising a two-dimensional, m×n element array of low resolution detector elements;

means for scanning the multi-resolution detector about the object by a predetermined spatial increment while being irradiated with x-ray energy; and means for reconstructing an image of the object from data provided by the multi-resolution detector, wherein the reconstructing means uses data values generated from the two-dimensional, m×n element array of low resolution detector elements along with estimated initial condition data values to iteratively reconstruct a high resolution image of the object.

24. The system according to claim 23, wherein the two-dimensional, m×n element array of low resolution detector elements in the multi-resolution detector is one dimensional and comprises Li elements, wherein i=1,2,3, . . . m.

25. The system according to claim 23, wherein the two-dimensional, m×n element array of low resolution detector elements in the multi-resolution detector is two dimensional and comprises m rows by n columns of elements.

26. The system according to claim 23, further comprising a display for displaying the reconstructed image of the object.

27. The system according to claim 23, further comprising a printer for printing a copy of the reconstructed image of the object.

28. A method for increasing resolution in an x-ray imaging implementation of an object, the method comprising the steps of:

providing an x-ray energy source;

emitting x-ray energy at the object;

acquiring the x-ray energy passing through the object with a multi-resolution detector comprising a two-dimensional, m×n element array of low resolution detector elements;

scanning the multi-resolution detector about the object by a predetermined spatial increment while being irradiated with x-ray energy; and reconstructing an image of the object from data provided by the multi-resolution detector, wherein the reconstructing uses data values generated from the two-dimensional, m×n element array of low resolution detector elements along with estimated initial condition data values to iteratively reconstruct a high resolution image of the object.

29. The method according to claim 28, wherein the two-dimensional, m×n element array of low resolution detector elements in the multi-resolution detector is one dimensional and comprises Li elements, wherein i=1,2,3, . . . m.

30. The method according to claim 28, wherein the two-dimensional, m×n element array of low resolution detector elements in the multi-resolution detector is two dimensional and comprises m rows by n columns of elements.

31. The method according to claim 28, further comprising the step of displaying the reconstructed image of the object.

32. The method according to claim 28, further comprising the step of printing a copy of the reconstructed image of the object.

* * * * *

UNITED STATES PATENT AND TRADEMARK OFFICE
CERTIFICATE OF CORRECTION

PATENT NO. : 5,822,392
DATED : October 13, 1998
INVENTOR(S) : Kristina H. V. Hedengren It is certified that error appears in the above-identified patent and that said Letters Patent is hereby corrected as shown below:

Title page, item [54] and col. 1, line 2, in the title, after "increasing" insert --RESOLUTION--.

Signed and Sealed this

Twenty-fourth Day of August, 1999

Attest:

Q. TODD DICKINSON

*Attesting Officer*     Acting Commissioner of Patents and Trademarks